United States Patent [19]

Nishiyama et al.

[11] 4,246,478
[45] Jan. 20, 1981

[54] POSITION DETECTOR WITH TWO TIMING DISKS ROTATING AT DIFFERENT SPEEDS

[75] Inventors: Yutaka Nishiyama, Higashiyamato; Nagao Mizutani, Hachioji; Tohio Kurihara, Tokorozawa, all of Japan

[73] Assignee: Citizen Watch Company Limited, Tokyo, Japan

[21] Appl. No.: 5,746

[22] Filed: Jan. 23, 1979

[30] Foreign Application Priority Data

Jan. 30, 1978 [JP] Japan ................................. 53-9020

[51] Int. Cl.³ .............................................. G01D 5/34
[52] U.S. Cl. ........................... 250/231 SE; 340/347 P
[58] Field of Search ..................... 250/231 SE, 237 G; 324/17 S; 340/347 P

[56] References Cited

U.S. PATENT DOCUMENTS

| | | | |
|---|---|---|---|
| 3,419,727 | 12/1968 | Pabst | 250/231 SE |
| 3,525,094 | 8/1970 | Leonard | 250/231 SE |
| 3,588,887 | 6/1971 | Landy | 340/347 P |

*Primary Examiner*—David C. Nelms
*Attorney, Agent, or Firm*—Jordan and Hamburg

[57] ABSTRACT

A position detector has first and second timing disks, each having at least one light-transmissive portion.

The second timing disk is rotated at a predetermined speed ratio with respect to the first timing disk. A timing sensor is disposed in close proximity to the outer circumference of the first and second timing disks to provide a timing signal when both the light-transmissive portions of the first and second timing disks rotating at predetermined speeds simultaneously pass by the position of the timing sensor.

2 Claims, 3 Drawing Figures

SLIT WHICH PASSES ACROSS TIMING SENSOR 18

SLIT OF TIMING DISK 13

SLIT OF TIMING DISK 15

TIMING SIGNAL A

SLIT WHICH PASSES ACROSS TIMING SENSOR 19

SLIT OF TIMING DISK 13

SLIT OF TIMING DISK 15

TIMING SIGNAL B

POSITION DETECTOR WITH TWO TIMING DISKS ROTATING AT DIFFERENT SPEEDS

This invention relates to a position detector which detects the angular position of a rotating member by means of an electric signal generated when a slit in a timing disk passes between a light emitting element and light receiving element arranged to oppose each other in a timing sensor, and more particularly to improvements in a position detector which detects the angular position of a rotating member periodically after the member has made a plurality of revolutions.

Examples of these position detectors can be found in the prior art. According to one such apparatus, there is provided a single timing disk which is reduced in speed so as to make one revolution in one period at the end of which the angular position of a rotating member is detected. This detection is accomplished by means of an electric signal which is generated whenever a slit formed in the timing disk passes the position of a timing sensor. This detection method requires an oversized reduction device owing to the large reduction ratio between the rotating member and timing disk. Moreover, the accuracy with which the angular position of the rotating member is detected depends on the product of slit indexing accuracy and the reciprocal of the reduction ratio of the timing disk. The accuracy with which the timing disk reduction device transmits rotation is also a contributing factor. It has therefore not been possible to detect with a high accuracy the angular position of a rotating member through the use of the apparatus described above.

Another example of a conventional apparatus makes use of a timing disk interconnected with the rotating member, and another timing disk reduced in speed so as to make one revolution in one period of a position detection. Each of these two timing disks is provided with a timing sensor such that two sets of electric signals are generated whenever the timing slits pass the positions of the sensors at the same time. The two sets of signals are processed by the AND gate of an electric circuit to detect the angular position of the rotating member. While highly accurate detection is possible, the apparatus requires the oversized reduction device of the previous example, the plurality of timing sensors, the generation of unnecessary signals, and the inclusion of the AND gate circuitry. These factors combine to raise the cost of the apparatus, increase its size and reduce its reliability.

It is therefore an object of the present invention to provide a position detector that overcomes the above-mentioned shortcomings encountered in the prior art.

It is another object of the present invention to provide a position detector which is small in size, light in weight, inexpensive and capable of performing detection with a high accuracy and reliability.

According to a feature of the present invention, these objects are obtained by means of a construction comprising a first timing disk interconnected with a rotating member and having at least one light-transmissive portion; a second timing disk mounted on the same axis as the first timing disk in close proximity thereto and associated with the first timing disk so as to rotate at a constant speed ratio with respect thereto and having at least one light-transmissive portion; and a timing sensor disposed in close proximity to the outer circumference of the first timing disk and the second timing disk and having a light emitting element and light receiving element arranged to oppose each other with the first timing disk and the second timing disk interposed therebetween, and positioned in the course of travel of the light-transmissive portions of the timing disks. In accordance with this construction, the angular position of the rotating member is detected by means of an electric signal which the light receiving element generates when the light-transmissive portions of the first and second timing disks simultaneously pass between the opposing light emitting element and light receiving element of the timing sensor.

In the accompanying drawings:

FIG. 1A is a cross-sectional view of the apparatus as viewed from the left side, and FIG. 1B is a front view of the apparatus with a portion thereof broken away.

Figure 1A:
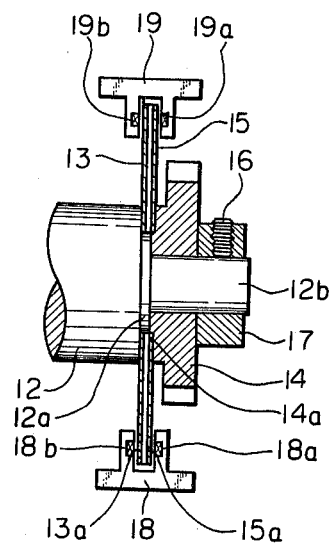
FIGS. 1A and 1B show the construction of a preferred embodiment of a position detector in accordance with the present invention.
Figure 1B:
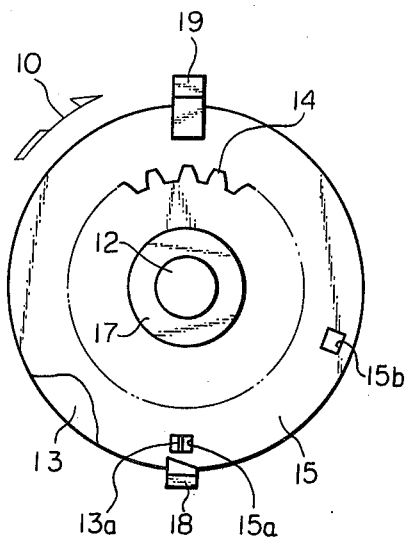

Referring now to FIGS. 1A and 1B, a position detector in accordance with the present invention comprises a first rotating member 12 rotatably mounted on a frame and rotated in the direction of arrow 10 by a driving member, neither the frame nor driving member being shown in the Figures; a first timing disk 13 secured to a stepped portion 12a of rotating member 12 and having a single elongated slit 13a extending along an axis parallel to the axis of rotating member 12 and serving as a light-transmissive portion; a second rotating member comprising a gear 14 concentric with the first rotating member 13 and axially supported by a small diameter portion 12b of rotating member 12 and rotatable in the direction of arrow 10 by a gear train (not shown) at a 3:5 speed ratio with respect to timing disk 13; and a second timing disk 15 secured to a stepped portion 14a of gear 14 in close proximity to first timing disk 13. The second timing disk 15 has slits 15a and 15b which are 5/3 times as wide as slit 13a, the slits 15a and 15b being located at the 0 and 72 degree positions of the disk 15 and serving as light-transmissive portions. A collar 17 is secured to an end of small diameter portion 12b of rotating member 12 by screw 16 to suppress axial movement of gear 14. First and second timing sensors 18 and 19 are secured to the frame (not shown) and disposed at the 0 and 180 degree positions along the outer circumference of the closely mounted timing disks 13 and 15, the timing sensors each having a light emitting and light receiving element that are arranged to oppose each other with the timing disks 13 and 15 interposed therebetween and which are positioned in the course of travel of the slit 13a of timing disk 13 and the slits 15a, 15b of timing disk 15.

The structure described above operates as follows. First timing disk 13 is rotated in the direction of arrow 10 by the first rotating member 12 which is driven rotatively by the driving member (not shown). Second timing disk 15 secured to gear 14 which is meshing with the gear train makes 3 revolutions in the direction of arrow 10 for every 5 revolutions of timing disk 13 in the same direction. In other words, timing disk 15 rotates at a 3:5 speed ratio with respect to timing gear 13. A prescribed voltage is applied to timing sensors 18 and 19 at the same time that rotating member 12 starts rotating. The light emitting elements therefore begin to emit light and the corresponding light receiving elements are placed in a stand-by condition awaiting to produce a signal upon intercepting a light beam.

Figure 2:
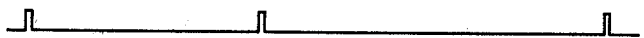
FIG. 2 shows a timing-chart for explaining the principles of production of timing signals in response to the apparatus shown in FIGS. 1A and 1B.
Figure 2:
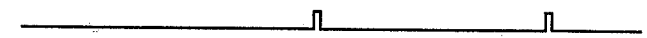

In FIG. 2, in can be seen that the slit 13a of timing disk 13 passes between the light emitting element 18a and light receiving element 18b of timing sensor 18 each time rotating member 12 makes N revolutions, whereas the slits 15a and 15b of timing disk 15 pass between the same two elements each time rotating member 12 makes 5N/3 and 5(N+0.2)/3 revolutions, respectively. Accordingly, slit 13a of timing disk 13 passes by the position of sensor 18 at the same time as one of the slits 15a, 15b of timing disk 15 each time rotating member 12 makes 5N and 5N+2 revolutions. Only when the slits pass through the sensor 18 in this simultaneous manner the light from the light emitting element is allowed to pass through the timing disks to impinge upon the light receiving element which produces the timing signal A in response thereto.

As described above, each of the slits 15a, 15b is 5/3 as wide as slit 13a. The accuracy with which the angular position of rotating member 12 is detected by timing signal A is therefore determined by the accuracy, in respect of time, with which slit 13a of timing disk 13 passes by the position of timing sensor 18. The angular position of rotating member 12 after 5N and 5N+2 revolutions is thus detected with a high accuracy by means of the timing signal A.

In a manner identical to that described above slit 13a of timing disk 13 passes the position of timing sensor 19 each time rotating member 12 makes 5N+0.5 revolutions, while slits 15a, 15 b of timing disk 15 pass timing sensor 19 each time the rotating member makes 5(N+0.5)/3 and 5(N+0.7)/3 revolutions, respectively. Accordingly, slit 13a passes the position of timing sensor 19 at the same time as one of the slits 15a, 15b each time the rotating member makes 5N+2.5 and 5N+4.5 revolutions. Timing sensor 19 therefore generates a timing signal B that allows the angular position of rotating member 12 to be detected after 5N+2.5 and 5N+4.5 revolutions. The accuracy with which the angular positon of the rotating member is detected by timing signal B is determined by the timing accuracy with which slit 13a in timing disk 13 passes the position of timing sensor 19. This makes it possible to detect the angular position with a high accuracy. The timing signals A and B can be utilized as a series of signals upon suitable processing through electronic circuitry or as signals classified according to each sensor.

In the present embodiment, gear 14 which mounts timing disk 15 is axially supported by rotating member 12. However, it is possible to adopt a structure in which the gear is axially supported by or secured to a shaft which is either fixed or axially supported in coaxial relationship with the rotating member 12. Gear 14 can also be replaced by a timing pulley arranged to rotate at a constant speed ratio with respect to timing disk 13.

The present embodiment described above may be modified so as to detect a plurality of arbitrary rotating member positions in a manner subsequently described. For example, the following means can be adopted to generate timing signals at a plurality of angular positions of the rotating member which are desired to be detected. Specifically, slits are provided in the first and second timing disks such that the slits will simultaneously pass through a timing sensor at each of the rotating member detection positions. The speed ratio of the first and second timing disks is then selected such that the slits passing the timing sensor postion do not come into agreement at positions other than those that are to be detected. If the required conditions cannot be satisfied with this arrangement by bringing the angular positions of the slits in the first timing disk into close proximity, it is possible to adopt a structure employing an additional timing sensor and adapt the arrangement such that the plurality of detection positions can be detected by suitably disposing each sensor so as to satisfy the required conditions. Further, if it is desired that the timing signals be classified into a number of signals, this can be accomplished by disposing the number of timing sensors required by the classification around the circumference of the timing disks in the manner described above and then appropriately processing the signals by corresponding circuits provided for this purpose. The present invention can also be applied to detect the angular position of a rotating body which rotates in the forward and reverse directions. When the position for detecting the angular rotation of the rotating member is different depending upon the forward or reverse rotation of the member, the structure described cannot be used for this purpose without being altered or modified. One method in which this can be accomplished is by providing a first timing disk and a second timing disk, at positions thereof having different turning radii, with slits for detecting angular position for rotation in both the forward and reverse directions. Timing sensors for detecting these angular positions for rotations in the forward and reverse directions would then be disposed in the course of travel of the corresponding slits in order to detect the desired angular positions.

The position detector according to the present invention makes it possible to reduce the speed ratio between the first and second timing disks so that a speed ratio conversion mechanism can be made small in size. Furthermore, the fact that there is little difference in rotation between the rotating member and the rotation transmission portion of the second timing disk makes it possible to employ a simple bearing to support the transmission portion. As only a small number of timing sensors are required to detect the angular position of the rotating member and since no unnecessary timing signals are generated, it is possible to dispense with AND elements that would otherwise be required to process these signals. These factors provide a highly reliable position detector which can be made small in size and low in price.

The accuracy with which the angular position of the rotating member is detected is determined by the indexing accuracy of the slit in the first timing disk if one timing sensor is employed. This allows detection with a high accuracy. If a plurality of timing sensors are employed, the accuracy with which the sensors are positioned with respect to the first timing disk is another factor which, together with the slit indexing accuracy, determines the detection accuracy. However, a highly accuract detection of angular position can be obtained since the positions of the sensors can be finely adjusted. Signals issued from these sensors can also be used upon being classified.

What is claimed is:

1. A position detector having a rotating member, comprising:
    a first timing disk interconnected with said rotating member and having at least one light-transmissive portion;
    a second timing disk mounted on the same axis as said first timing disk in close proximity thereto and rotatable at a predetermined speed ratio with respect to said first timing disk, said second timing disk having at least one light-transmissive portion; and a timing sensor disposed in close proximity to the outer circumference of said first and second timing disks and having a light emitting element and light receiving element arranged to oppose each other with said first and second timing disks interposed therebetween;

the angular position of the rotating member being detected by means of an electric signal which the light-receiving element generates when the light-transmissive portions of said first and second timing disks simultaneously pass between the opposing light emitting element and light receiving element of said timing sensor.

2. A position detector according to claim 1, in which the light-transmissive portion of said second timing disk is different in width than that of said first timing disk.

* * * * *